United States Patent [19]
Langner et al.

[11] Patent Number: 5,201,293
[45] Date of Patent: Apr. 13, 1993

[54] METHOD OF MONITORING THE OPERATION OF AN INTERNAL COMBUSTION ENGINE

[75] Inventors: Arnd-Matthias Langner, Kornwestheim; Richard Schleupen, Grossingersheim, both of Fed. Rep. of Germany

[73] Assignee: Robert Bosch GmbH, Stuttgart, Fed. Rep. of Germany

[21] Appl. No.: 790,640

[22] Filed: Nov. 8, 1991

[30] Foreign Application Priority Data

Nov. 9, 1990 [DE] Fed. Rep. of Germany ....... 4035957

[51] Int. Cl.$^5$ ......................... F02D 41/22; F02P 17/00
[52] U.S. Cl. ................................. 123/436; 123/479; 123/481; 123/630; 73/117.3
[58] Field of Search ............... 123/479, 481, 436, 419, 123/630, 198 D, 198 F; 73/117.3

[56] References Cited

U.S. PATENT DOCUMENTS

| | | | |
|---|---|---|---|
| 4,003,248 | 1/1977 | Leichle | 73/116 |
| 4,023,358 | 5/1977 | Maurer et al. | 123/198 D |
| 4,691,288 | 9/1987 | Kay et al. | 364/511 |
| 4,930,481 | 6/1990 | Fujimoto et al. | 123/479 |
| 4,971,010 | 11/1990 | Iwata | 123/435 |
| 5,035,220 | 7/1991 | Uchinami et al. | 123/481 |

FOREIGN PATENT DOCUMENTS

| | | |
|---|---|---|
| 0344349 | 12/1989 | European Pat. Off. . |
| 3724420 | 2/1989 | Fed. Rep. of Germany . |
| WO90/02874 | 3/1990 | World Int. Prop. O. . |

*Primary Examiner*—Andrew M. Dolinar
*Attorney, Agent, or Firm*—Frishauf, Holtz, Goodman & Woodward

[57] ABSTRACT

A method of monitoring the operation of an internal combustion engine, such as is usable in a motor vehicle, combines the recognition of ignition failures with recognition of combustion failures. In one embodiment combustion failures are detected by the faltering of torque delivered by the engine. Ignition failures are electrically detected in terms of spark voltage or spark duration. In a first embodiment the rate of ignition and combustion failures is first compared with a predetermined threshold and if neither threshold is exceeded, the detection of an individual ignition failure is deemed plausible and is registered if detected. Only a failure rate in excess of a threshold results in cylinder-specific remedial measures to protect a catalyst in the exhaust system. In a second embodiment, unlike the first, only an ignition failure results in a cylinder-selective remedial action.

2 Claims, 4 Drawing Sheets

METHOD OF MONITORING THE OPERATION OF AN INTERNAL COMBUSTION ENGINE

This invention concerns monitoring internal combustion engines, particularly in a motor vehicle, with respect to ignition and combustion failures by a combination of procedures suited for different engine operation conditions so that at least one procedure operates effectively in each step of operating conditions.

BACKGROUND AND PRIOR ART

A method of monitoring the operation of an internal combustion engine is known from European patent document EP-0 344 349. In that method the spark duration is monitored electrically from the primary side of an ignition coil. Monitoring of an internal combustion engine for recognition of combustion failures can be done by two known methods, for example, the method which depends on recognizing faltering in the torque produced by the engine, disclosed in U.S. Pat. No. 4,691,288, and the determination of combustion failure, either by a lambda probe signal, disclosed in European patent document EP-0 387 254, or else by the monitoring of exhaust gas temperature.

These known methods of combustion failure recognition have the disadvantage, however, that the recognition of individual or statistically distributed failures is difficult. Furthermore, the possibility of recognition of a combustion failure is limited to operation of an engine under very small load. Also, the recognition of faltering torque in particular has the disadvantage that mechanical vibrations of a motor and shaking of the vehicle by the roadway make the recognition of failures by that method most difficult. By a falter or faltering of the torque produced by an engine is meant irregular or uneven delivery of torque.

SUMMARY OF THE INVENTION

It is an object of the present invention to combine a combustion failure recognition procedure with an electrical ignition monitoring procedure so that under every likely set of engine operation conditions, at least one of these procedures will provide useful information and possibilities of remedy.

Briefly, in one embodiment of the method, if a combustion failure is detected in the initial step, it is then investigated whether in the same power stroke an ignition failure has been detected. If that inquiry has a negative answer, the combustion failure is registered and at most an overall precaution, such as a step to protect a catalyst in the exhaust system, is taken before there is a return to the first step for the next power stroke. If there is also an ignition failure, the cylinder correlation is obtained, the failure is registered and a cylinder-specific remedy is initiated such as the shut off of fuel to the cylinder, before returning the the first step. If no combustion failure is detected, a decision is then made as to whether an isolated ignition failure is detectable. If so, the cylinder correlation for the power stroke in question is obtained and if an individual ignition failure is electrically detected, the failure is registered before return to the first step. If no ignition failure is detected, registration of that factor is preferably done before return to the first step for the next power stroke.

In another embodiment of the method, where the engine monitoring equipment includes a torque falter sensor for detecting combustion failure, the first step is to interrogate the engine operation condition data as to whether torque falter information is usable. If the answer to that question is in the affirmative the combustion monitoring device is interrogated as to whether the falter rate is greater than a predetermined threshold falter rate $a$, and if another affirmative answer results, combustion failure is registered, and the cylinder corresponding to the power stroke in process has its fuel cut-off.

If torque falter information is not usable, the electrical ignition monitoring is consulted to find out if the ignition failure rate is greater than a predetermined ignition failure rate and if the answer to that inquiry is positive, an ignition error is registered, the cylinder correlation is consulted, and fuel is cut-off to the affected cylinder. If neither of the above mentioned failure rates exceeds the respective predetermined thresholds, it is investigated whether conditions are suitable for detection of an individual ignition failure. If the answer to that investigation is affirmative, it is determined whether an ignition failure has been detected in the current power stroke and if so an ignition error is registered but no remedy is applied.

The methods of the invention has the advantage that in every likely set of engine operation conditions at least one method branch delivers usable results. It is particularly advantageous to phase out a method branch that delivers only inexact results when other method branches are operable.

In the case of the second embodiment, when no error rate is above threshold, it is particularly advantageous to check for plausibility of a possible ignition failure in the power stroke being investigated in order to eliminate any serious risk of error when there is actually a normal ignition or combustion.

DRAWINGS

The invention is further described by way of illustrative example with reference to the annexed drawings in which.

DESCRIPTION OF THE ILLUSTRATED EMBODIMENTS

Figure 1:
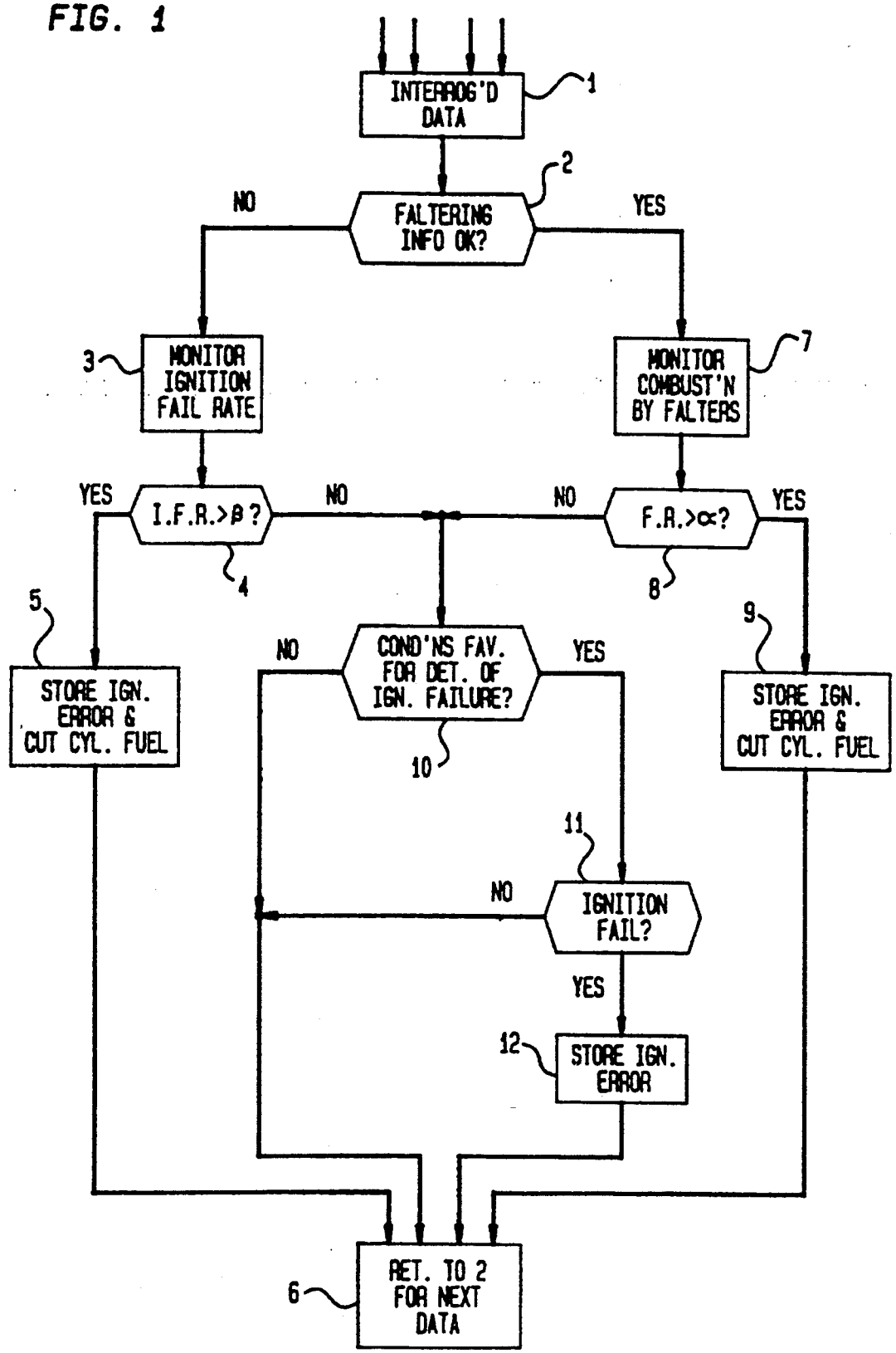
FIG. 1 is a flow diagram of a first embodiment of the method of the invention.

FIG. 1 shows a preliminary program stage 1 of collecting values of various operating parameters of the internal combustion engines such as speed (rpm), torque, temperature, etc. so that all of these parameters can be available during each power stroke of the engine. These parameters are furnished in this case for determination in stage 2 whether the method of torque falter observation is usable for obtaining significant information with reference to combustion failures. A negative answer, indicating that this procedure is not usable, for example under extreme roadway conditions or when the engine has a very small load, leads to stage 3 in which the electrical monitoring of ignition failures is consulted regarding the ignition failure rate, and then to stage 4, which decides whether that rate exceeds a predetermined threshold rate $\beta$. The electrical monitoring of ignition failures can conveniently be performed on the primary side of an ignition coil (not shown) either by monitoring the ignition voltage or the spark duration. The predetermined threshold rate $\beta$ is a rate above which a catalyst in the exhaust gas system might be damaged. If there is a risk of catalyst damage, in the program step 5 a cylinder-selective cut-off of fuel is performed and an ignition defect is registered. Then in the next program stage 6 there is a jump back to stage 2 for another cycle, for example in the next power stroke.

If in stage 2, it is determined that torque falter information is reliable enough to be usable, in program stage 7 of FIG. 1 the torque falter monitor is consulted to determine in program stage 8 whether the falter rate exceeds a predetermined threshold rate $\alpha$, which is again used to define a threshold above which there is risk of damage to a catalyst in the exhaust system. If the falter rate does exceed that threshold, cylinder fuel is cut-off from the affected cylinder and a combustion error is registered in stage 9, after which stage 6 produces a return to stage 2 for another power stroke.

If in stage 4 the ignition failure rate is found to be lower than the threshold critical for the catalyst, or if in stage 8, the torque falter rate, corresponding to a combustion failure rate, is below threshold $\alpha$, stage 10 of the method illustrated in FIG. 1 comes in to play. At this stage it is determined whether the engine operating conditions are suitable for reliable detection of individual ignition failures. The recognition of individual ignition failures is reliable only in operation of the engine between no load or negative load and a partial load threshold, a range of operation range conditions corresponding to a limited field of engine operating parameters. If the conditions for reliable recognition of individual ignition failures is not present, program stage 6 comes into play for returning to stage 2 for another power stroke. An affirmative answer in stage 10 leads to stage 11 in which it is observed whether an ignition failure has taken place in the power stroke under analysis. If the answer is "no" again, program step 6 provides a return to stage 2 for another power stroke, but if an ignition failure is recognized, an ignition failure is registered in stage 12, but cutting off of fuel injection is not necessary in this case, since sporatic individual ignition failures do not lead to damage of a catalyst in the exhaust system. After the registration of the ignition error, program step 6 leads to return to stage 2 for another power stroke.

The advantages of torque falter recognition and other recognition of combustion failures (i.e. not only in cases of electrical ignition failure) are hereby complemented by the advantages of electrical ignition failure recognition. Electrical ignition failure recognition has good recognition possibilities for statistically distributed individual failures in engine operation under no load or negative load and up to a certain partial load on the engine, as well as at low speeds. At the same time, the disadvantages of torque falter recognition under the influence of extraneous mechanical shaking can to a large extent be compensated, since the electrical ignition failure recognition still remains operative during disturbed torque falter detection.

Figure 2:
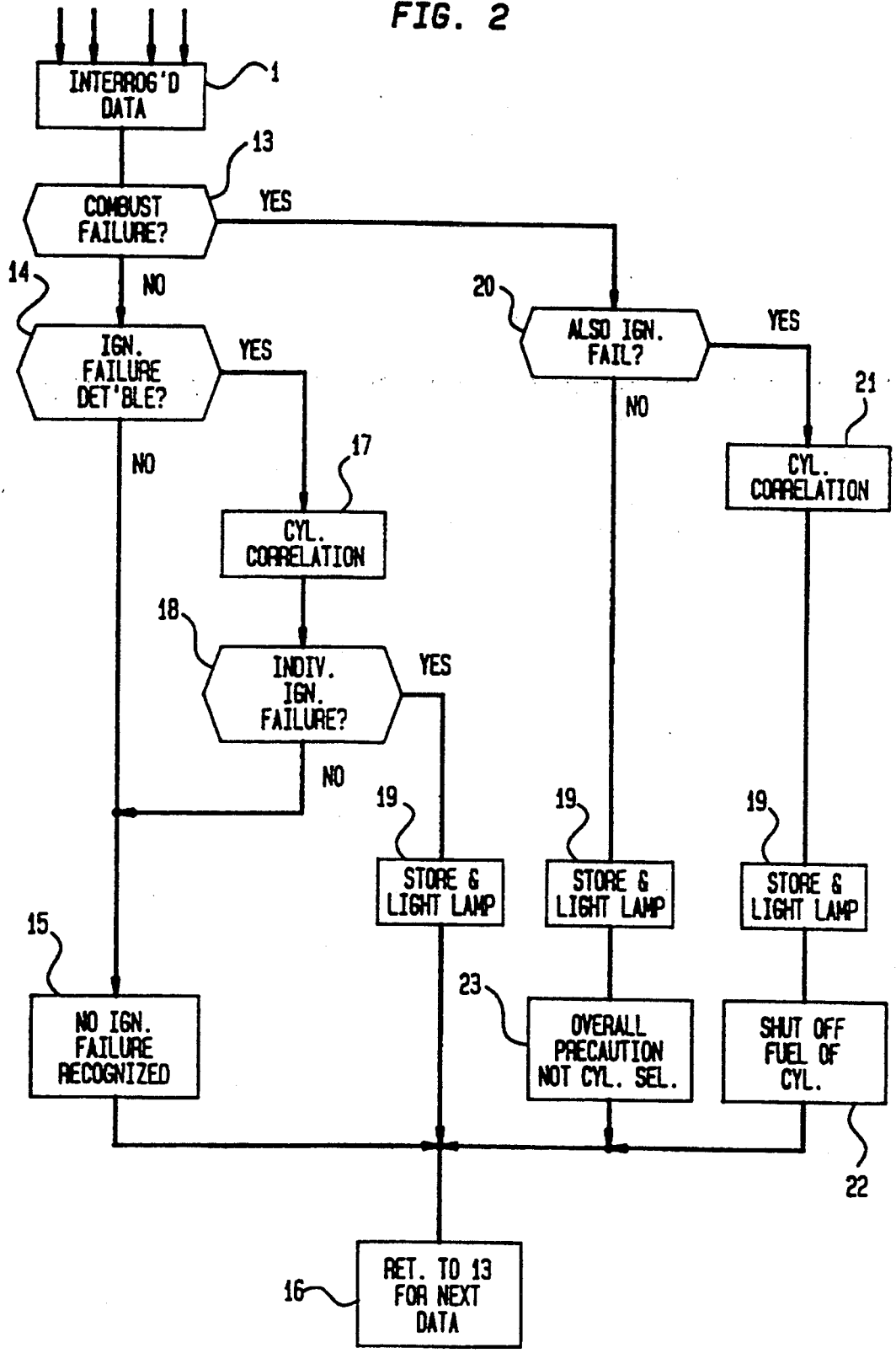
FIG. 2 is a flow diagram of a second embodiment of the method of the invention.

FIG. 2 shows another embodiment of a method according to the invention combining recognition of combustion failures with electrical recognition of ignition failures. As in the case of FIG. 1, the engine operation data to be interrogated is obtained in stage 1 and is periodically renewed at intervals suitable for the particular data. In this case the first interrogation is shown at stage 13, where it is determined whether a combustion failure has been detected from the data available in stage 1. In the embodiment of FIG. 2, instead of the torque falter recognition of a combustion failure which was described in connection with FIG. 1, two other procedures are available, either an evaluation of the exhaust gas composition by means of a lambda signal or monitoring the exhaust gas temperature. If both of these methods are provided, the selection of one or both of them and the evaluation takes place in stage 13 and is not shown elsewhere in FIG. 2. The choice of one of these methods may depend upon the data of stage 1 that has been interrogated, so that one will be preferred during certain conditions of engine operation and the other under other conditions of engine operation, and perhaps sometimes both of them in parallel, with a correlation between them provided by a plausibility stage not shown in FIG. 2. Both of these methods have the advantage that they are not limited to recognizing ignition failures and are capable of recognizing combustion failures from various other causes. With these methods, however, no correlation with the power strokes in the several cylinders can usually be carried out and the detection of isolated combustion failures is problematic and may be impossible to carry out because of great inertia in the system.

If no combustion failure is recognized, which means that the question of stage 13 is answered with "no", stage 14, in a manner dependent upon the operating parameters of the engine, takes up the question whether recognition of individual ignition failures is possible. If recognition of isolated ignition failures is found not to be possible, stage 15 then registers absence of failure recognition. This registration may be coupled with shutting off previously initiated protective measures. After stage 15, stage 16 directs a jump back to stage 13 as soon as new data is available from stage 1, or as soon as a next interval for interrogation has arrived.

If in the program stage 14 a positive answer has been found for the question whether conditions are favorable for detection of isolated ignition failures, stage 17 is activated to identify the cylinder which is in a power stroke, by reference to the firing order of the cylinders. Then in stage 18, it is determined electrically whether an individual ignition failure has occurred. If that inquiry is answered in the negative, stage 15 again registers the absence of ignition failure and return to stage 13 is provided by stage 16. If an individual ignition failure is detected in stage 18, that result is registered and a diagnosis lamp is lighted, after which stage 16 is then ultilized to return to stage 13 for another cycle.

If stage 13 determines affirmatively that a combustion failure has been detected, stage 20 is activated for the determination of whether ignition failures can be recognized. At the same time a statistically derived ignition failure rate is determined. If in stage 20 an ignition failure is recognized, for example by detecting the spark voltage by observing the primary side of an ignition coil and/or determining by the current in the secondary of an ignition coil the duration of the spark, a correlation is then made with the cylinder firing order to identify the cylinder affected by the ignition failure. Then follows the already described stage 19 in which the ignition failure is registered and a diagnosis lamp lighted, but in this case it is appropriate in stage 22 to apply remedial measures that are cylinder-selective, for example, in the case of sequential fuel injection, the shutting off of fuel injection from the particular cylinder. Thereafter stage 16 again returns the program to stage 13.

If no ignition failure is recognized at stage 20, the combustion failure detected in stage 13 cannot be related to a particular cylinder, so that after the following stage 19 registers the combustion failure, only an overall remedial measure is carried out in stage 23, for example, shutting off a bank of cylinders supplied through one fuel injection channel of the engine. After stage 23, stage 16 again returns the program to stage 13.

Figure 3:
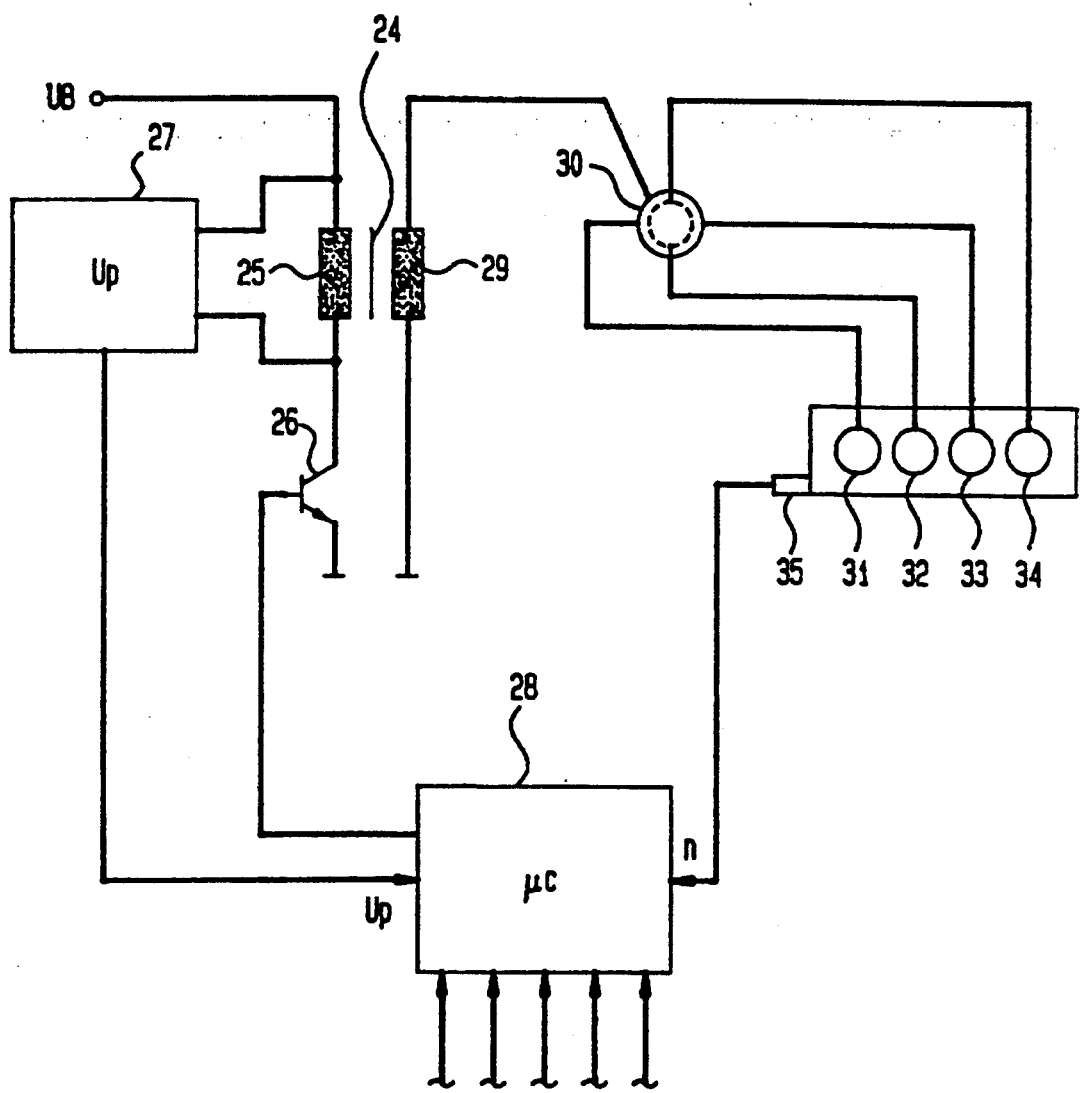
FIG. 3 is a basic diagram for the organization of equipment for use in the practice of the methods of the invention.

FIG. 3 shows the basic construction of means for determining the necessary magnitudes for the monitoring of an internal combustion engine. An ignition coil 24 has its primary winding 25 connected at one end to the battery voltage UB and at the other end to a control transitor 26 through which the ignition coil is connected to ground or chassis. A voltage measuring circuit 23 senses through the primary winding 25 the spark voltage as transformed to a voltage $U_p$ across the primary winding 25 and supplies that voltage to a microcomputer 28. The control transistor 26 has its base electrode likewise connected to the microcomputer 28 which, among other things, controls the interruption time for the energizing circuit of the primary winding 25.

The secondary winding 29 of the ignition coil 24 is connected with a distributor that assures that the high voltage is supplied, in accordance with the cylinder firing order, to the respective spark plugs (not shown) of four cylinders 31 to 34. An engine speed (rpm) sensor 35 monitors the engine speed for torque falters and provides its output to the microcomputer 28. All the operating parameters of the engine that are of interest are made available to the microcomputer 28, which then operates according to one of the programs respectively described in FIGS. 1 and 2, or some modification thereof, so that deficient operation of the internal combustion engine will be recognized and appropriate remedial measures initiated.

Figure 4:
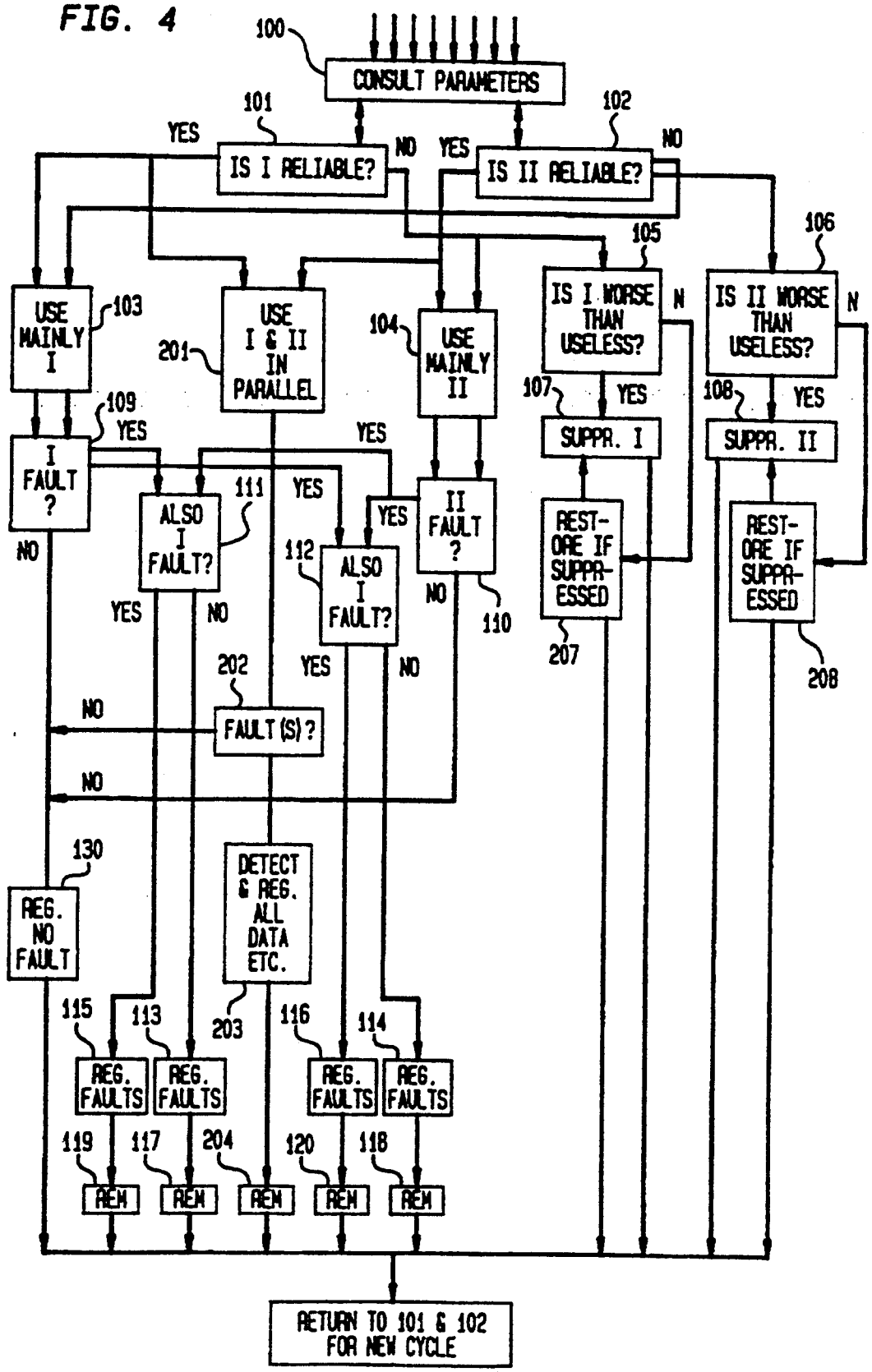
FIG. 4 is a flow diagram of an embodiment of the method of the invention which combines features of the first and second embodiment.

FIG. 4 shows a method of monitoring an internal combustion engine which combines features of the methods explained with respect to FIGS. 1 and 2.

The rectangle 100 at the top of FIG. 4, like the rectangles 1 in FIGS. 1 and 2, represents the furnishing of parameters of the operation of the internal combustion engine during the monitoring. Again, these parameters may be registered at the start of every cycle of the kind diagramed in FIG. 4 until a new cycle is ready to begin at which time they are updated, or they may be updated at times or even gradually in accordance with the operation of the engine.

In FIG. 4 the stages 101 and 102 are entered simultaneously, or they could be entered sequentially provided that the first one to be entered does not go out of this stage until the other one is ready to exit this stage.

Stage 101 determines whether a type I fault detection method is reliable. A type I fault detection method comprises at least one ignition fault detection system, so that at least one ignition fault detection method is applied to determine, at this stage, only whether a type I fault detection method is reliable in view of the engine operating parameters that are available and consulted in stage 101. A type II fault detection method comprises at least one combustion fault detection system and involves the performance of at least one combustion fault detection method for determining, in stage 102, only whether a type II method and system is reliable under the circumstances defined by the engine operating parameters which are available and consulted at that time.

If stages 101 and 102 reveal that both type I and type II systems and methods are reliable under the circumstances found in unit 100, both systems and methods are utilized in parallel and this is shown in stage 201 of FIG. 4.

If only type I methods and systems are reliable under the circumstances that were found, only one or more methods and systems which detect an ignition fault are primarily used. This is shown by stage 103 in FIG. 4. Conversely, if only one or more type II methods and systems are reliable under the current conditions, stage 104 is activated and only systems and methods for detecting combustion faults are primarily used. Of course only one of stages 201, 103 and 104 is activated by the results of stage 101 and 102, but at the same time stage 105 or 106, or both stages 105 and 106, are activated. The engine operating parameters of unit 100 may indicate through stages 105 and 106 that either ignition fault detection or combustion fault detection is not only unreliable but is actually worse than useless because of the errors likely to result under these engine operation conditions. If that is the case, the operation of ignition fault detection (I) or that of combustion fault detection (II), or both, are suppressed or blocked (stages 107 and 108). On the other hand, if in a previous cycle one or both kinds of systems and methods were suppressed or blocked, a determination at stage 105 or 106, or both, that the particular kind of system and method is not worse than useless causes the termination of suppression or blocking of a particular type or types (I or II or both) fault detection. This is indicated by the stages 207 and 208 which are labelled "RESTORE IF SUPPRESSED".

Now let it be assumed that both ignition fault detection and combustion fault detection are reliable. Stage 201 then activates stage 202 to determine any fault is to be found. If none is found, the absence of fault is registered in stage 130, after which there is a return to 101 and 102 for a new cycle. If at least one fault is found at stage 202 all data of significance are detected and registered in stage 203, after which any failures and their nature are stored, in stage 204, where the acroynm REM stands for "register error in memory."

If stage 103 is activated by stages 101 and 102, the possible presence of an ignition fault is detected at stage 109. If none is found stages 130 and 133 are entered as before so that return for a new cycle thereafter takes place. If an ignition fault is found, stage 111 is activated to determine whether there is also a combustion fault. This means that even if stage 103 is activated, stage 104 must be activated, as well as stage 110 in order to satisfy stage 111 if that stage is called upon to determine whether there is a combustion fault. For this reason two different ways of activating stages 109 and 110 are shown in FIG. 4, so that if stages 103 and 109 are primarily used, stage 110 will give its information only to stage 111 and, likewise if stages 101 and 102 select stage 104 for primary use, stage 109 will activate stage 112, but will not also activate stage 111.

According to whether a combustion fault information is available, stage 111 causes stage 113 or stage 115 to register the ignition fault or faults. Stage 117 or stage 119 registers the error in memory, after which the process goes to stage 133 for return to stages 101 and 102 for the next cycle. FIG. 4 does not show any remedial measures applied or specify lighting of a lamp to indicate a fault. These are left out to simplify the diagram and references is made to FIGS. 1 and 2 and their description for indicating when a lamp should be lighted, when fuel to a particular cylinder should be shut off and when an overall precaution which is not cylinder-selective should be applied to protect a catalyst in the exhaust system.

When stages 101 and 102 favor the use of type II detection systems and methods, stage 104 activates stage 110 to determine if a combustion error is found. If not, stages 130 and 133 are sequentially activated, with a return to stages 101 and 102 for a new cycle thereafter. If a combustion fault is found, stage 112 is activated to determine whether an ignition fault might also be found. No ignition fault can be found if stage 105 has determined that ignition fault detection under the contemporary conditions is worse than useless, the ignition fault information then being suppressed, but unless that information is suppressed, stage 109 will supply the ignition fault information in stage 112. Stage 112 will then cause the registration of faults in either in stage 114 if no ignition fault is also clearly present or in stage 116 if an ignition fault has been recognized as well as a combustion fault. At stages 114 and 116 the registering of the error or errors in memory is activated in respective stages 118 and 120, followed by return for a new cycle through stage 133.

FIG. 4 and its description indicate that it may be useful to have more than one ignition fault detection system and more than one combustion fault detection system, since some ignition fault dectection systems are more suitable at certain engine operation conditions and another ignition fault detection system ma be useful under some other engine operating conditions. The same applies to combustion fault detection systems. In some cases it may be desirable to utilize information about the rate of faults of one kind or the other and under other conditions it may be important to determine isolated faults regardless of the rate at which such faults have occurred in the past. These considerations have already been mentioned with reference to the methods of FIG. 1 and FIG. 2.

Although the invention has been described with reference to particular illustrative examples of the method of the invention, it will be understood that variations and modifications may be made and features of one of these examples introduced into the other, within the inventive concept.

We claim:

1. A method of monitoring, in a motor vehicle, an internal combustion engine thereof comprising a plurality of cylinders having a predetermine power stroke sequence, means for detecting faltering transmission of torque from said engine, means for monitoring combustion by torque falters, means for electrical monitoring of ignition failure and failure rate and identification of cylinder affected by ignition failure and means for determining conditions for plausible detection of isolated ignition failures, said method including the steps of:

(1) determining whether circumstances of engine operation are such that faltering torque information is useful for detecting combustion failure;

(2) if circumstances of ignition operation are found useful for detecting combustion failures by torque falters, monitoring combustion failures thereby and determining whether torque falters are more frequent then a predetermined falter rate ($\alpha$);

(3) if torque falters are found more frequent then said predetermined falter rate ($\alpha$), registering an combustion failure, identifying an affected cylinder and producing a cylinder-specific remedy and thereafter returning to step 1 of this method for another power stroke;

(4) if circumstances of engine operation are found unfavorable for detecting combustion failures by torque falters, electrically monitoring ignition failure rate and thereby determining whether ignition failures are more frequent than a predetermined ignition failure rate ($\beta$);

(5) if an ignition failure rate exceeding said predetermined ignition failure rate ($\beta$) is found, registering an ignition failure, identifying an affected cylinder, producing a cylinder-specific remedy and thereby after returning to step (1) of this method for another power stroke;

(6) if an ignition failure rate is found which is not greater than said predetermined ignition rate ($\beta$) and if a torque falter rate is found which is not greater than said predetermined torque falter rate ($\alpha$), determining whether engine operating conditions are such that electrical detection of an individual ignition failure would be plausible, and if so, determining electrically whether in the present power stroke an individual ignition failure takes place;

(7) if an individual ignition failure is found to have taken place in step (6) of this method, registering an isolated ignition error and returning to step (1) of this method for another power stroke, and (8) if in step (6) ignition operating conditions are found to be such that the electrical detection of an individual ignition error would be implausible, or if in step (7) no individual ignition error is detected, returning to step (1) of this method for a succeeding power stroke.

2. The method of claim 1, wherein said cylinder-specific remedy is in each case shutting off fuel injection for said affected cylinder.

* * * * *